(12) United States Patent
Warsh

(10) Patent No.: US 6,226,621 B1
(45) Date of Patent: May 1, 2001

(54) SYSTEM AND METHOD FOR ADMINISTRATION OF AWARDS PROGRAM

(76) Inventor: Brad P. Warsh, 389 Loudonville Rd., Loudonville, NY (US) 12211

( * ) Notice: Subject to any disclaimer, the term of this patent is extended or adjusted under 35 U.S.C. 154(b) by 0 days.

(21) Appl. No.: 09/049,849

(22) Filed: Mar. 27, 1998

(51) Int. Cl.$^7$ .................................................. G06F 17/60
(52) U.S. Cl. ................................................................ 705/14
(58) Field of Search ................................................ 705/14

(56) References Cited

U.S. PATENT DOCUMENTS

| | | | |
|---|---|---|---|
| 5,239,460 | * | 8/1993 | LaRoche ................................ 705/11 |
| 5,483,444 | * | 1/1996 | Heintzeman et al. .................... 705/5 |
| 5,537,314 | * | 7/1996 | Kanter ..................................... 705/14 |
| 5,608,785 | * | 3/1997 | Kasday ............................... 379/93.13 |
| 5,689,100 | * | 11/1997 | Carrithers et al. ................... 235/380 |
| 5,802,501 | * | 9/1998 | Graff ....................................... 705/36 |

FOREIGN PATENT DOCUMENTS

| | | | | |
|---|---|---|---|---|
| 0308224A2 | * | 3/1989 | (EP) ............................. G06F/15/21 |
| 2308474 | * | 6/1997 | (GB) ............................. G06F/17/60 |
| 99/21103 | * | 4/1999 | (WO) ............................ G06F/17/00 |

OTHER PUBLICATIONS

Byron, S.D.; Rimsky, N.T., "Courting Tenants Through Creative Leasing," Commercial Investment Real Estate Journal, v7n5, pp. 18–23, Sep./Oct. 1988.*

Farber, Barry J., "In Their Own Words," Small Business Reports, v19n4, pp. 13–17, Apr. 1994, Issn: 0164–5382, retrieved from DIALOG.*

Platts, D., 'Wrapping–up the Who, Where, When, What, and Why of Sales,' Bank Marketing, v30n6 pp. 35–41, Jun. 1998, retrieved from: DIALOG.*

\* cited by examiner

Primary Examiner—Allen R. MacDonald
Assistant Examiner—Forest O Thompson
(74) Attorney, Agent, or Firm—Piper Marbury Rudnick & Wolfe

(57) ABSTRACT

A system for administering an awards program for an apartment, office, retail or industrial property. The property in question is divided into units or spaces, and an award is provided to a person living in the property or working in the property if that person's actions result in a new resident or tenant. The value of an award is a function of the level of occupancy, and increases or decreases with increasing level of occupancy. The value of an award might be based on the percentage occupancy, the number of occupied units or the area occupied.

19 Claims, 5 Drawing Sheets

SYSTEM AND METHOD FOR ADMINISTRATION OF AWARDS PROGRAM

BACKGROUND OF THE INVENTION

This invention relates to awards programs for improving use of limited resources. In particular, it relates to awards programs for raising the level of occupancy of rental property.

Awards programs of various kinds are well known for improving sales of products.

A first class of awards program provides participants with awards for regular purchases of a particular company's goods or services. Sometimes the awards will be provided by the company from which the goods or services are purchased. Often, though, the awards will be provided by a sponsoring company, who will gain advertising from the awards program. In an example of such an awards program, customers purchase goods or services, and are awarded points providing discounts on airline tickets. This class of awards program is not specifically addressed by the present invention.

A second class of awards program provides customers or clients with awards for introducing new customers or clients to the company. Such an awards program clearly benefits the introducing customer who is provided with the award, and benefits the company by generating new customers without advertising. The cost to the company can be easily quantified, and provides a guaranteed return in increased revenue brought by the new customer which will more than offset the award. Such programs are often provided by utility companies, such as telecommunications providers, but have always provided a constant award for attracting new customers. This class of awards program is addressed by the present invention.

SUMMARY OF THE INVENTION

The present invention provides a computer controlled system for administering an awards program for increasing use of a limited resource by giving a participant in the program an award for increasing the use of the limited resource. Participants will generally be users of the resource. The value of an award is related to the level of usage of the resource. As the value of an award is dependent on the level of usage of the resource, the program generates more interest from participants, and accordingly makes it more likely that the participant will be more active in finding new customers for the resource, as the participant will be more focused on the awards program.

In a first aspect of the invention, the value of an award decreases as the level of usage of the resource increases. As the resource gets closer to being completely used, more revenue will be generated by the resource. The beneficiary of the profits from the resource, who will typically be the owner of the resource, is therefore less and less concerned about increasing the level of usage, and is inclined to pay out less of an award. Furthermore, as the value of an award decreases with increasing level of usage, the participant is given a sense of urgency to get the award at its current value before it decreases.

In a second aspect of the invention, the value of an award increases as the level of usage of the resource increases. While this might not initially seem to be in the interests of the beneficiary of the use of the resource, such an awards program has fundamental advantages over an awards program in which the value of an award decreases or remains constant. Increasing the value of an award with increasing level of usage gives a much stronger incentive for the participant to increase the use of the resource. It also gives an impression that the participants are in partnership with the beneficiary of the use of the resource, and prevents resentment of the beneficiary who would otherwise be benefiting from the increased use of the resource, while providing less and less to the participants. Furthermore, increasing the value of an award as the level of usage increases gives a much more positive image to the participant.

In a specific example of this aspect of the invention, the value of an award increases linearly with increased level of usage of the resource. This gives a simple, positive image for the participant, giving the participant an impetus to find new customers of the resource.

It is a further object of the invention to provide a system for administering such a program wherein the resource is an apartment property, wherein increased use of the resource constitutes a person becoming a resident in the property, and wherein the participants are residents in the property.

It is a further object of the invention to provide a system for administering such a program wherein the resource is an office property, wherein increased use of the resource constitutes a company becoming a tenant in the property, and wherein the participants are employees of the tenants in the property.

It is a further object of the invention to provide a system for administering such a program wherein the resource is a retail property, wherein increased use of the resource constitutes a company becoming a tenant in the property, and wherein the participants are employees of tenants in the property.

It is a further object of the invention to provide a system for administering such a program wherein the resource is an industrial property, wherein increased use of the resource constitutes a company becoming a tenant in the property, and wherein the participants are employees of tenants in the property.

DETAILED DESCRIPTION OF THE INVENTION

Figure 1:
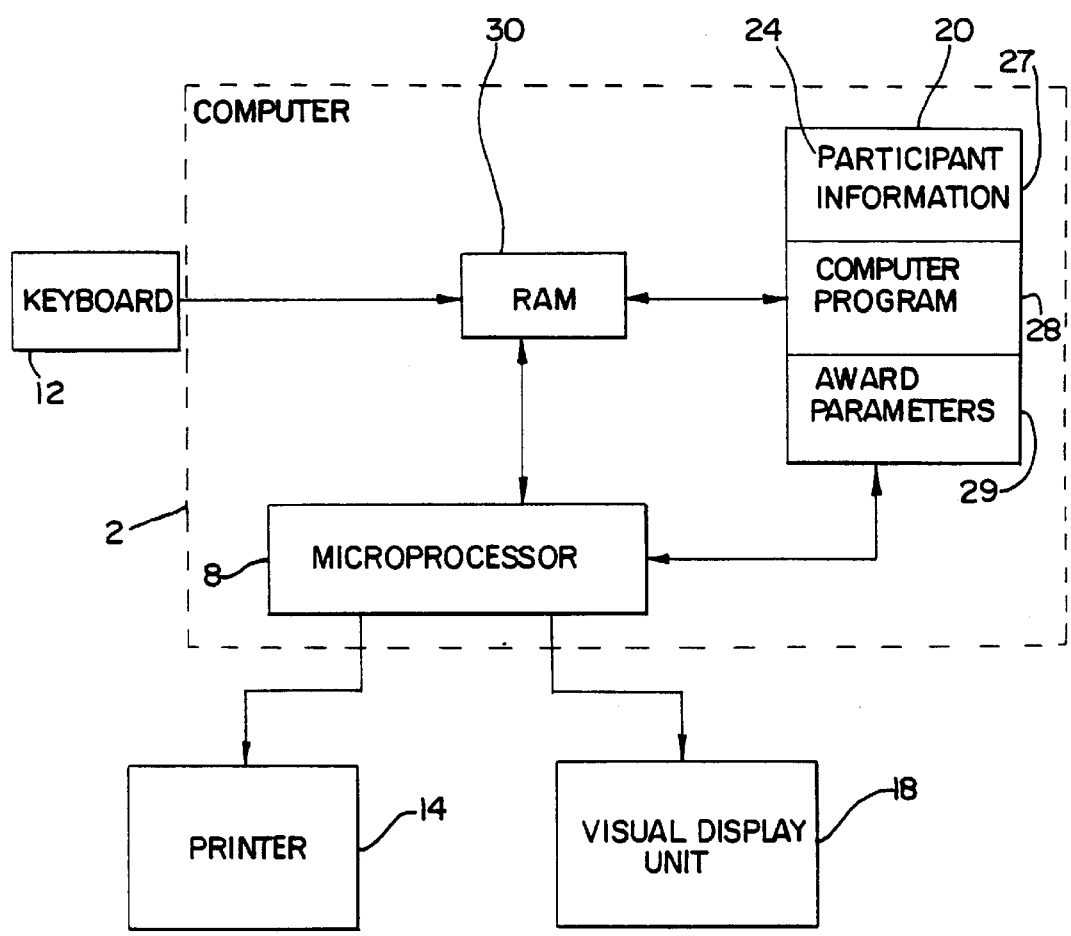
FIG. 1 shows the components of a system according to a first embodiment of the invention.
Figure 2:
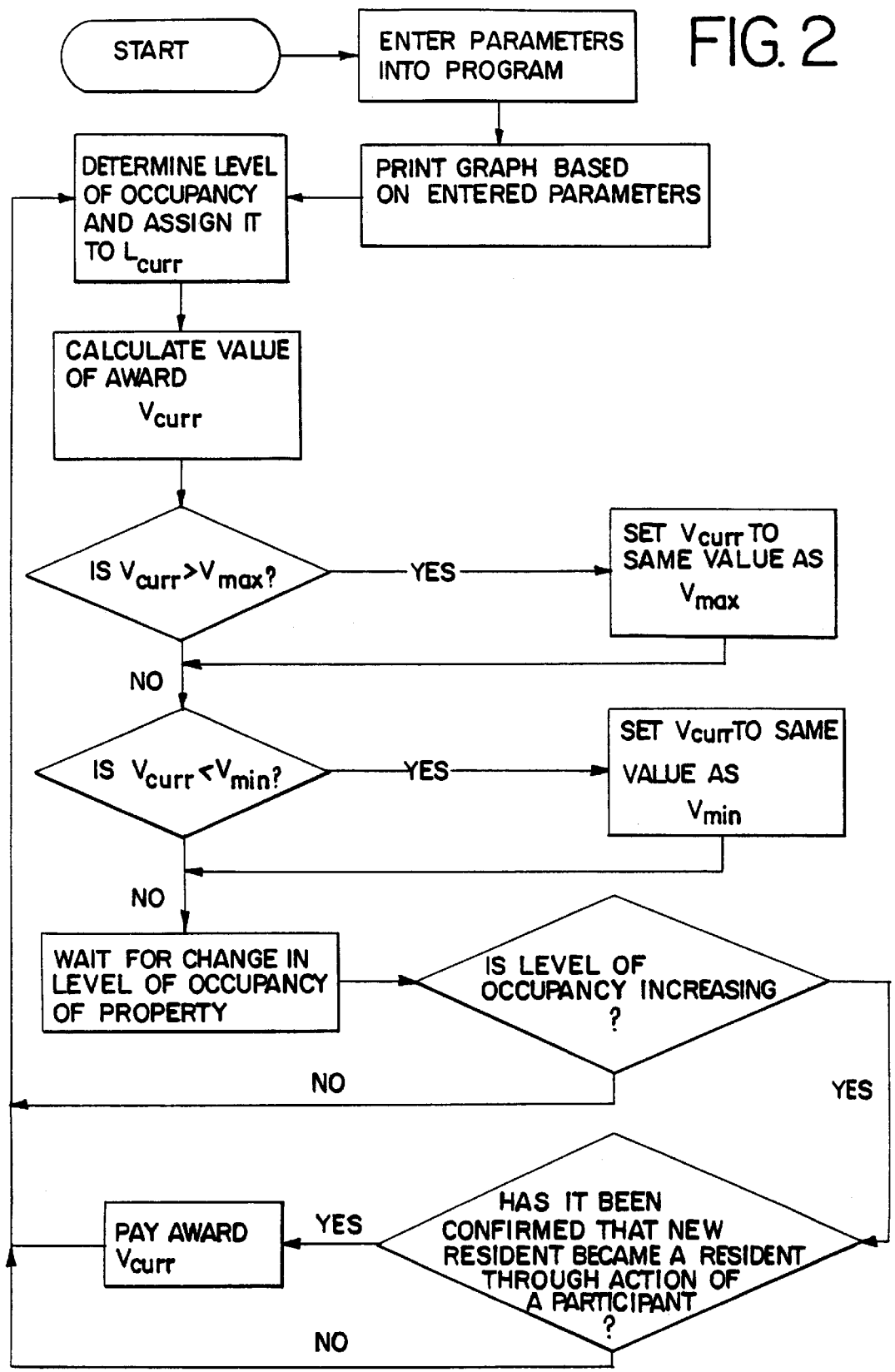
FIG. 2 is a flow chart showing the operation of the system of the first embodiment of the invention.

A first embodiment of the present invention is hereinafter described with reference to FIG. 1 which shows components of a system according to the invention. FIG. 2 is a flow chart showing the operation of the system of the first embodiment of the invention. According to this embodiment, the system calculates the value of an award to be paid out to a participant in an awards program for taking actions which result in a new occupant, whereby to increase the level of occupancy in a rental property. Participants in the awards program are occupants in the property. Actions which result in a new occupant might comprise telling a potential occupant about the program. The embodiment which is discussed hereinafter relates to an awards program in an apartment property.

A computer 2 is provided, for example a standard personal computer. The specific design of the computer is not important to the invention. The computer comprises a microprocessor 8, long term memory 20 and random access memory 30. It controls a printer 14, and a visual display unit 18. The computer 2 receives input from a keyboard 12. Each of these components can be of any compatible design, and are standard components of most desktop computer systems.

A computer program 28 is provided which is stored in the long term memory 20 and can be transferred to random access memory 30 by the microprocessor 8. This computer program 28 acts on data 24 in random access memory 30 or in the long term memory 20. In alternative embodiments of the invention, the data 24 is stored as part of the computer program 28.

The data 24 includes participant information 27, such as name, address and details relating to participation in a program.

The data 24 also includes award parameters 29 which the computer program 28 uses to calculate the value of an award. The minimum value of an award $V_{min}$, the maximum value of an award $V_{max}$, the minimum level of occupancy $L_{min}$, the maximum level of occupancy $L_{max}$ and the current level of occupancy $L_{curr}$ are all stored for use by the computer program 28.

The minimum level of occupancy $L_{min}$ is the minimum percentage occupancy. The maximum level of occupancy $L_{max}$ is the maximum percentage occupancy. A value of 99% is selected for $L_{max}$ in this case.

The values $V_{min}$ and $V_{max}$ are selected by the system administrator, depending on the specific requirements of the program. These values will be generally proportional to the average rental rate for the property and will be of the same order of magnitude as a month's rent.

The ratio of these values $V_{min}$ and $V_{max}$ are determined empirically. A higher ratio between minimum value of an award and maximum value of an award will increase participant interest in the program; the level of occupancy will have a bigger impact on the value of an award, and it is therefore in the participant's interest to take more interest in the level of occupancy. However, with bigger ratios of maximum value of an award and minimum value of an award, either the maximum value of an award has to be very high which can decrease the profits the program is intended to produce, or the minimum value of an award has to be very low, decreasing interest in the awards program when the level of occupancy is low. A value of $V_{max}$ approximately twice as large as $V_{min}$ is presently preferred although further research may show significantly smaller or larger ratios to be more advantageous.

Figure 3:
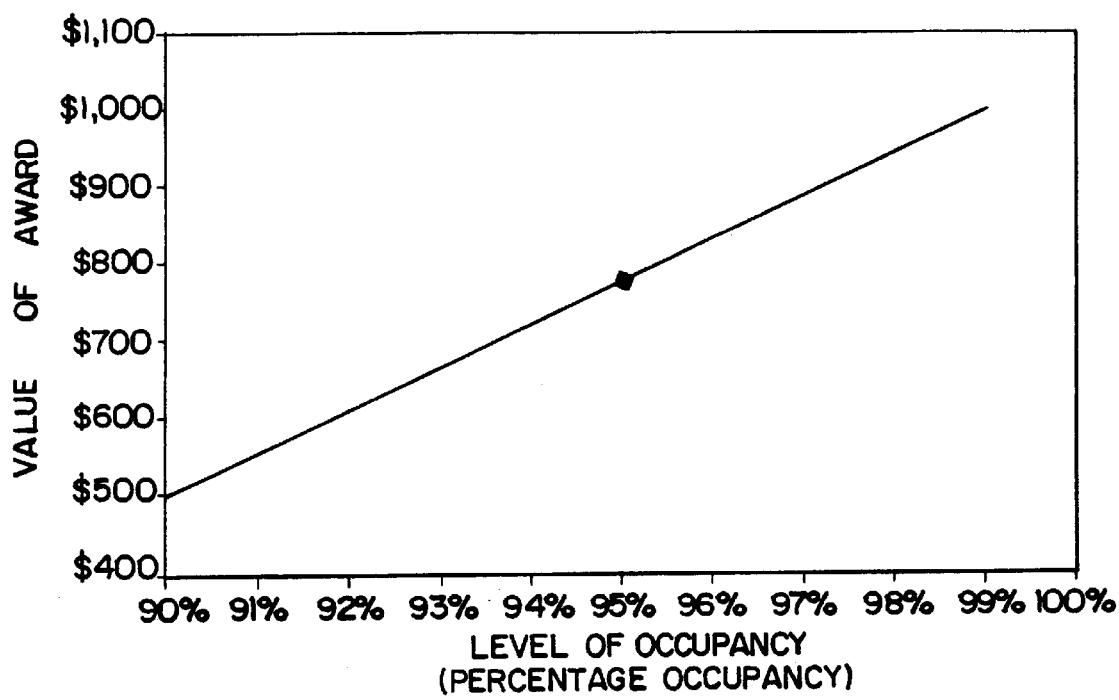
FIG. 3 is a graph showing a function used by the system of the first embodiment of the invention.

In a specific example shown in FIG. 3, these values are $500 and $1,000 in an apartment property.

The current level of occupancy $L_{curr}$ is the current percentage occupancy.

The computer program 28 has a procedure for calculating the current value of an award $V_{curr}$ based on the parameters $V_{min}$, $V_{max}$, $L_{min}$, $L_{max}$, and $L_{curr}$ stored in the data 24 when the current level of occupancy $L_{curr}$ is between $L_{min}$ and $L_{max}$, according to the following formula:

$$V_{curr} = V_{min} + \frac{V_{max} - V_{min}}{L_{max} - L_{min}}(L_{curr} - L_{min}) \quad (1)$$

This equation gives the value of an award as a straight line function of level of occupancy as shown in FIG. 3, with the value of an award varying from $V_{min}$ when $L_{curr}=L_{min}$, to $V_{max}$ when $L_{curr}=L_{max}$. In order to ensure that the value of an award never goes above $V_{max}$, $V_{curr}$ is set at $V_{max}$ when $L_{curr}$ is greater than $L_{max}$. In order to ensure that the value of an award never goes below $V_{min}$, $V_{curr}$ is set at $V_{min}$ when $L_{curr}$ is less than $L_{min}$.

The program contains routines for converting this equation into graphical format over at least the range $L_{min}$ to $L_{max}$ under control of the microprocessor 8. These routines are most easily implemented using a standard spreadsheet package such as Microsoft Excel. The resulting graph is sent by the microprocessor 8 to the printer 14 which prints the graph. The graph is suitably displayed in an area of the apartment property in which the participants will frequently see the graph. The graph shows the level of occupancy and the value of an award through the use of a marker, in similar manner to the graph shown in FIG. 3 and is preferably reprinted and posted whenever the level of occupancy of the apartment property changes so that participants have up to date information about the current value of an award. However, the information could be updated less frequently to decrease the burden on the system administrator.

When a new resident for the apartment property is found and the system administrator is made aware that the resident has taken occupancy due to the actions of a participant in the program, a payment is made to the participant, the value of which is calculated using Equation 1. The award can be paid in various ways which will vary depending on the accounting system used by the system administrator. It would normally be most straightforward to pay out a check to the participant. Alternatively a participant's account could be credited by the value of an award, so that the participant would make a lower rental payment the next month. In modifications of the embodiment, where it is appropriate, the computer program 28 contains routines for printing checks with the participant details, stored in a database in long term memory 20, and the appropriate value of an award. Payment directly into the participant's bank account is also envisaged.

The award is optionally made contingent on the new resident remaining a resident for a certain predetermined period, such as one month, whereby to avoid abuse of the program. If such a condition is imposed, the date on which the new resident takes occupancy is entered into the long term memory 20 on computer 2. A routine in computer program 28 calculates the difference between the present date and the date in memory, and when this difference becomes greater than the predetermined period, the system administrator is alerted so that payment can be made. The record can then be removed from the long term memory 20. This routine could be added to the computer's start up procedure, so that the system administrator would be alerted automatically on starting up the computer.

According to a modification of the first embodiment, whenever $L_{curr}$ falls below $L_{min}$, $L_{min}$ is changed by the system administrator, or by the program, to the current level of occupancy. This can easily be achieved by the computer program 28 by comparing $L_{min}$ to $L_{curr}$, and setting $L_{min}$ to $L_{curr}$ when $L_{min}>L_{curr}$. However, changing $L_{min}$ increases the burden on the system administrator.

Figure 4A:
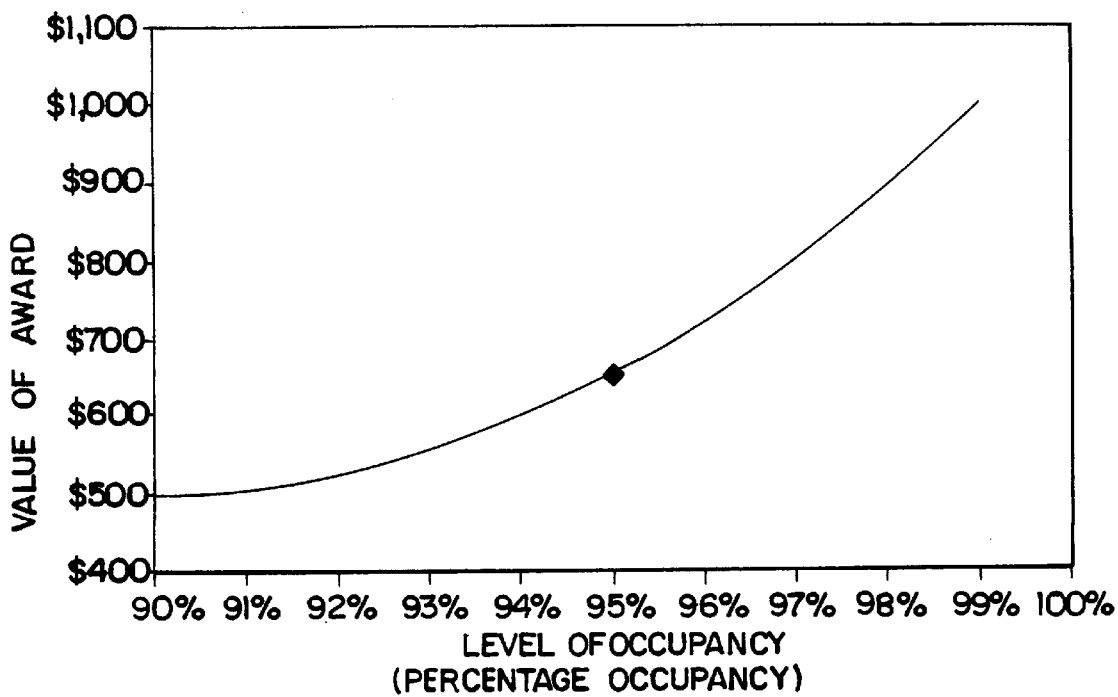
FIGS. 4a, 4b and 4c are graphs showing functions used by modifications of the system of the first embodiment of the invention.

In further modifications of the first embodiment, different equations, which are functions of $L_{curr}$ are used. An example is shown in FIG. 4a, which uses the following equation:

$$V_{curr} = V_{min} + \frac{(L_{curr} - L_{min})^2}{(L_{max} - L_{min})^2}(V_{max} - V_{min}) \tag{2}$$

This function is an increasing polynomial function, and gives a very positive image to the participant, who will be strongly encouraged to increase the level of occupancy in the property, and results in a lower overall payout to the participants of the program than the straight line function for the same values $V_{min}$ and $V_{max}$. This is clearly advantageous to the beneficiary, where the beneficiary is the entity that benefits from the income generated by the property. It has the disadvantage that it is not as straightforward for the participant to understand the operation of the function. Clearly, similar polynomial or exponential functions could also be used. While the straight line function is presently preferred, further experimentation is required to establish the optimum shape of the function.

Figure 4B:
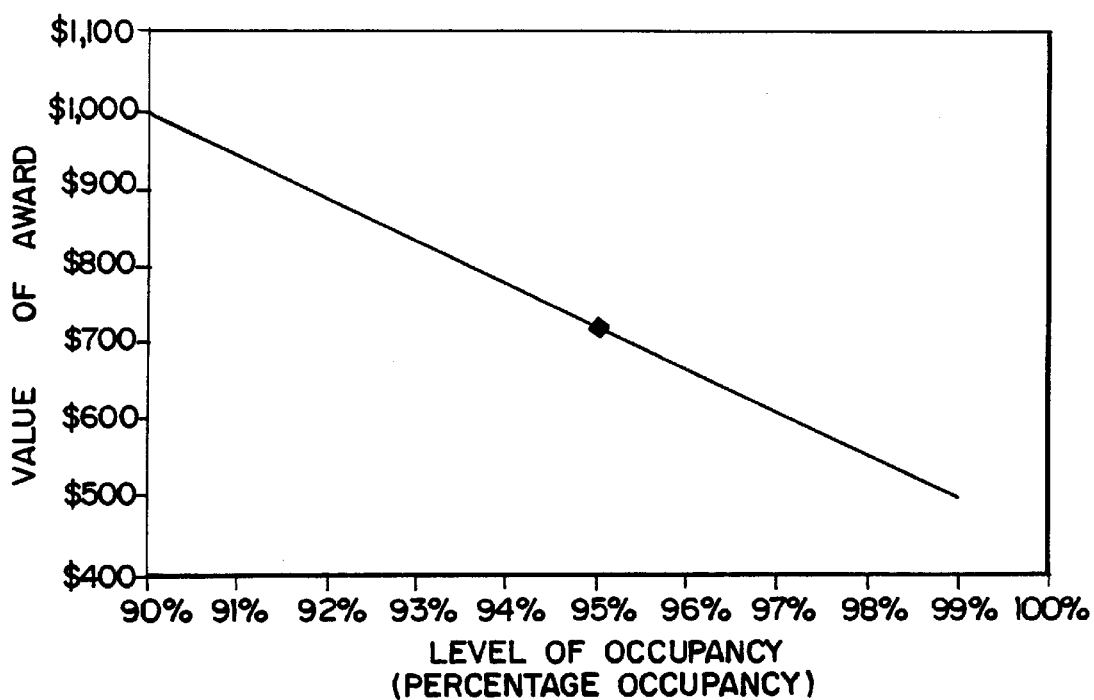

Another function which could be used to replace the function of Equation 1 is shown in FIG. 4b. This graph shows the following function which gives a decreasing value of an award as the level of occupancy increases:

$$V_{curr} = V_{max} - \frac{V_{max} - V_{min}}{L_{max} - L_{min}}(L_{curr} - L_{min}) \tag{3}$$

However, decreasing the value of an award with increasing level of occupancy generates a negative impression on the participant, and can generate resentment. As the level of occupancy increases, the beneficiary profits more and more, while the participants receive less and less.

Figure 4C:
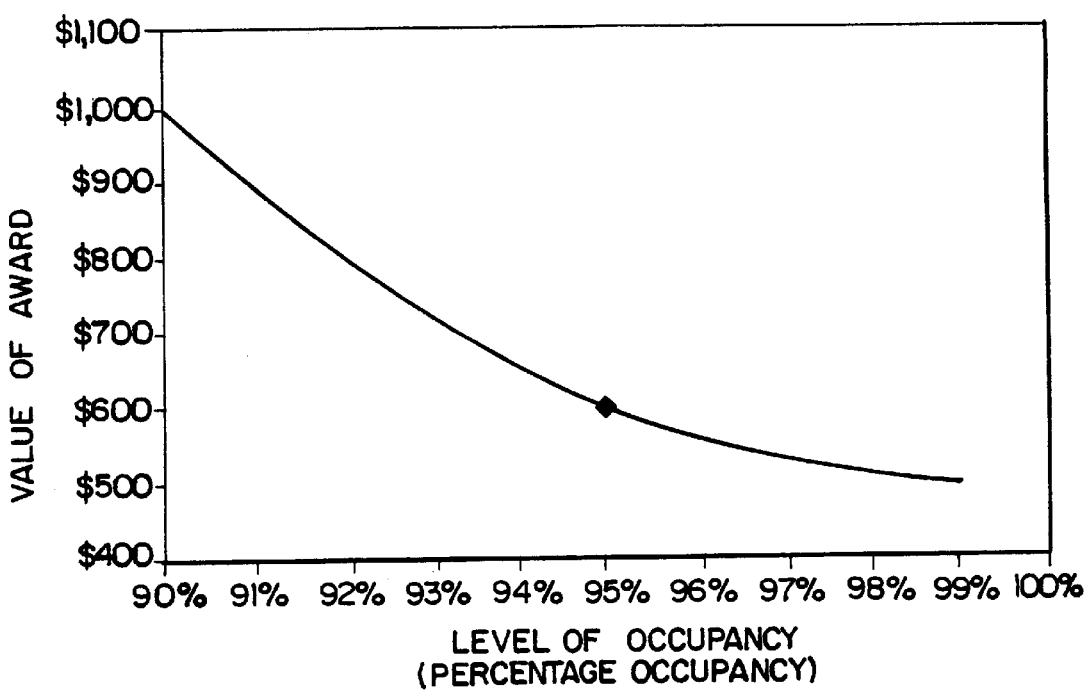

FIG. 4c shows the counterpart equation to that shown in FIG. 4a:

$$V_{curr} = V_{min} + \frac{(L_{max} - L_{curr})^2}{(L_{max} - L_{min})^2}(V_{max} - V_{min}) \tag{4}$$

which could be used when a decreasing value of an award is required.

In a further modification of the first embodiment of the invention, the value of an award is further modified to reflect the rental rate of the apartment in question. In a simple modification, the value of an award already calculated according to one of the previous equations is adjusted as follows:

$$V_{adj} = \frac{R_{curr}}{R_{avg}} V_{curr} \tag{5}$$

where $R_{avg}$ is the average rental rate for all the apartments in the property and $R_{curr}$ is the current rental rate of the apartment in question. However, using this equation has the disadvantage that participants might feel cheated if the current rental rate of the apartment in question is less than the average rental rate, as they will receive less than the value implied by the graph described above. An alternative equation for the adjusted value of an award is therefore as follows:

$$V_{adj} = V_{curr} + \lambda(R_{curr} - R_{min}) \tag{6}$$

where $R_{min}$ is the minimum rental rate for all the apartments and $\lambda$ is a scale factor. With this equation, the value of an award never falls below the value shown on the graph, and effectively gives a bonus for finding residents for more valuable apartments in the property.

The system of this embodiment, and all subsequent embodiments, can further be modified to allow more than one property to participate in the same program. The level of occupancy in the properties taking part in the program is displayed in each of the properties, giving a greater number of eligible participants and allowing a wider selection of apartments.

A disadvantage of this embodiment is that it is difficult to select a maximum level of occupancy $L_{max}$ which is generally applicable. A maximum level of occupancy $L_{max}$ of 99% is suitable in many, but not all, cases. If $L_{max}$ is too low, the maximum value of an award $V_{max}$ will be paid out more than once as the level of occupancy reaches its maximum level, which is clearly not in the interests of the beneficiary. If $L_{max}$ is too high and the property does not have many apartments, the level of occupancy immediately prior to the property being filled will be less than $L_{max}$, and the maximum value of an award $V_{max}$ will never be paid out.

A second embodiment of the present invention provides an alternative. According to this embodiment, the minimum level of occupancy $L_{min}$ is the number of occupied units in the apartment property at the time the program commences, rather than the percentage occupancy. The maximum level of occupancy $L_{max}$ is the number of occupied units at capacity.

According to this embodiment, the program has a procedure for calculating the value of an award based on the parameters $V_{min}$, $V_{max}$, $L_{min}$ and $L_{max}$, stored in the data and the current level of occupancy according to the following formula:

$$V_{curr} = V_{min} + \frac{V_{max} - V_{min}}{L_{max} - 1 - L_{min}}(L_{curr} - L_{min}) \tag{7}$$

Figure 5:
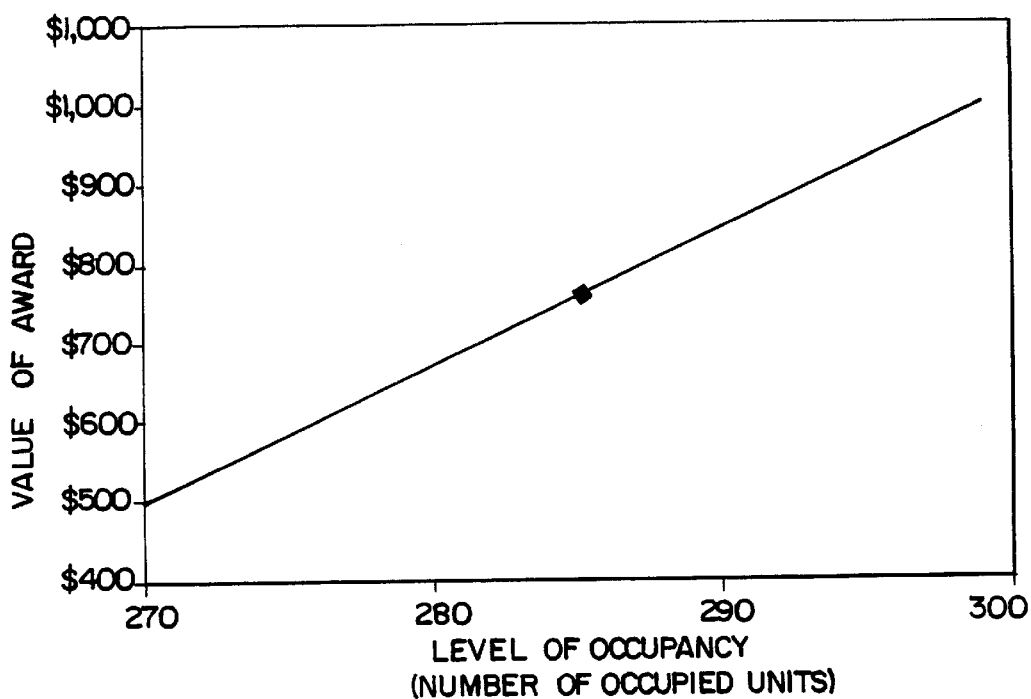
FIG. 5 is a graph showing a function used by the system of the second embodiment of the invention.

This equation gives the value of an award as a straight line function of the level of occupancy as shown in FIG. 5, with the value of an award varying from $V_{min}$ when $L_{curr}=L_{min}$, to $V_{max}$ when $L_{curr}=L_{max}-1$, i.e. when the last unit is about to be occupied. If the level of occupancy falls below $L_{min}$ at any time, the value of an award $V_{min}$ is paid.

A third embodiment of the present invention provides a system for giving incentives for increasing level of occupancy of apartment properties as a function of the area that is being rented which is also a function of the level of occupancy of the property.

A simple way of calculating the value of an award to be given is to decide on the minimum value of an award per unit area $V_{min}$ when the property is at its minimum level of occupancy $L_{min}$, the maximum value of an award per unit area $V_{max}$ when the property is at its maximum level of occupancy $L_{max}$, and calculate the value of an award, based on $L_{curr}$ and $L_{final}$ which are occupied before and after the area has been rented, as follows:

$$V_{curr} = (L_{final} - L_{curr})\left(V_{min} + \frac{L_{curr} + L_{final} - 2L_{min}}{2(L_{max} - L_{min})}(V_{max} - V_{min})\right) \tag{8}$$

Figure 6:
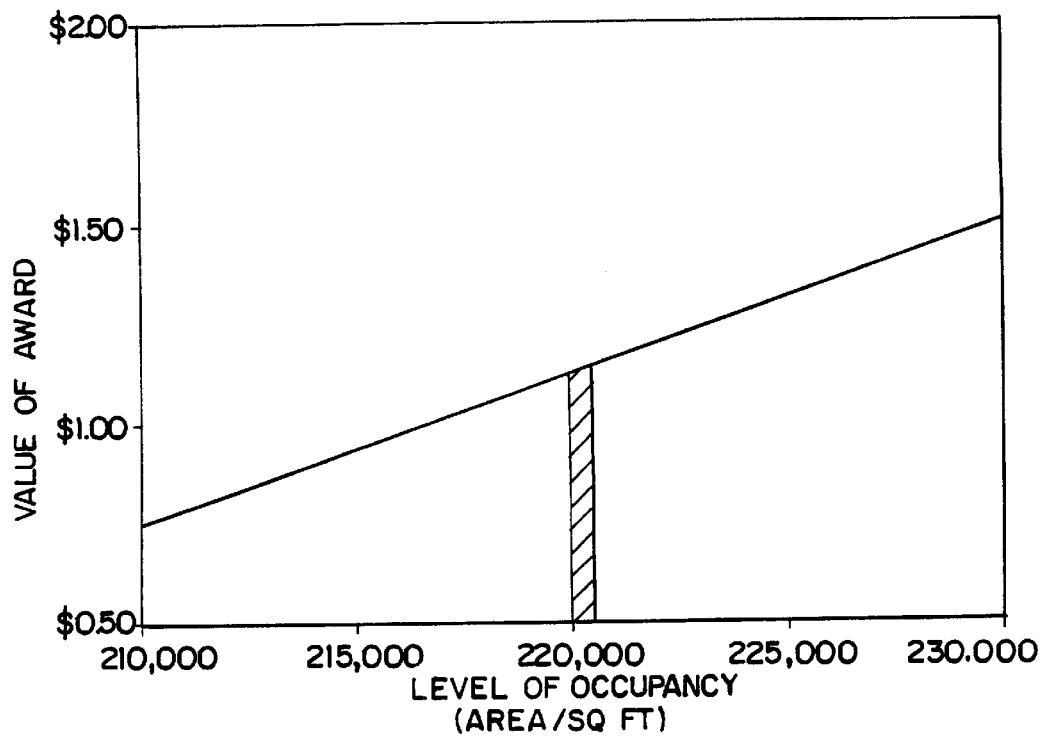
FIG. 6 is a graph showing a function used by the system of the third embodiment of the invention.

As an example, a minimum value of an award per unit area $V_{min}$ of \$0.75/sq ft is selected when the property is at its minimum level of occupancy with $L_{min}=210,000$ sq ft, and a maximum value of an award per unit area $V_{max}$ of \$1.50/sq ft is selected when the property is at its maximum level of occupancy with $L_{max}=230,000$ sq ft. The value of an award for renting out the space starting at a level of occupancy $L_{curr}$ of 220,000 sq ft and finishing at a level of occupancy $L_{final}$ of 220,775 sq ft would be \$883, as represented by the shaded section in FIG. 6.

In a modification of all the embodiments of the invention described, instead of providing an awards program for an apartment property, an awards program is provided for an office property. Participants of the program will be employees of the tenants in the property.

In a further modification of all the embodiments of the invention described, instead of providing an awards program for an apartment property, an awards program is provided for a retail property. Participants of the program will be employees of the tenants in the property.

In yet a further modification of all the embodiments of the invention described, instead of providing an awards program for an apartment property, an awards program is provided for an industrial property. Participants of the program will be employees of the tenants in the property.

Where the participants are employees of tenants in properties involved in the program, payment of awards can be simplified by supplementing an employee's pay. The computer program 28 automatically prepares information for sending out by mail or sending out by electronic means, to the payroll departments of the companies with employees taking part in the program. In certain circumstances, this could cut down the burden on the system administrator.

Embodiments in accordance with the invention are envisaged in which the resource comprises seats or cabin space on an airplane, train or ship.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What I claim is:

1. A system for administrating an awards program providing an award to a participant for improving use of a limited resource, said system including:

memory means including registers to store data corresponding to parameters for a function representing a value of said award;

data entry means connected to said memory means for entering said parameters in said memory means;

processor means connected to said memory means for calculating said function; and a means for communicating the value of said award to said participant; wherein the value of said function is based on the level of usage of said resource just prior to the time a participant causes an increase in the level of usage, the value of said function increasing as the level of usage of said resource increases.

2. A system in accordance with claim 1 wherein said function increases linearly with the amount of said resource used.

3. A system in accordance with claim 1 wherein the value of said award is a function of the percentage use of said resource.

4. A system in accordance with claim 1 wherein the resource comprises discrete quantities, and the value of said award is a function of the number of said discrete quantities used.

5. A system in accordance with claim 1 wherein the value of said award when the level of usage of said resource is below the lower limit of said predetermined range is the same as the value of said award when the level of usage of said resource is at the lower limit of said predetermined range.

6. A system in accordance with claim 1 wherein the value of said award when the level of usage of said resource is above the upper limit of said predetermined range is the same as the value of said award when the level of usage of said resource is at the upper limit of said predetermined range.

7. A system in accordance with claim 1 wherein said resource comprises a rental property arranged to be partitioned into at least two areas, each of which can be independently rented.

8. A system in accordance with claim 7 wherein the value of said award is a function of the percentage occupancy of said rental property.

9. A system in accordance with claim 7 wherein said areas comprise units, and wherein the value of said award is a function of the number of said units which are occupied in said rental property.

10. A system in accordance with claim 7 wherein the value of said award is a function of the area rented in said rental property.

11. A system in accordance with claim 7 wherein said property is an apartment property, and wherein said areas are units in the apartment property.

12. A system in accordance with claim 7 wherein said property is in an office property, and wherein said areas are spaces in the office property.

13. A system in accordance with claim 7 wherein said property is a retail property, and wherein said areas are spaces in the retail property.

14. A system in accordance with claim 7 wherein said property is an industrial property, and wherein said areas are spaces in the industrial property.

15. A system in accordance with claim 1 wherein the means for communicating includes a graphic display.

16. A system for administrating an awards program providing an award to a participant for improving use of a limited resource, said system including:

memory means including registers to store data corresponding to parameters for a function representing a value of said award;

data entry means connected to said memory means for entering said parameters in said memory means;

processor means connected to said memory means for calculating said function; and a means for communicating the value of said award to said participant; wherein the value of said function is based on the level of usage of said resource just prior to the time a participant causes an increase in the level of usage, the value of said function decreasing as the level of usage of said resource increases.

17. A system in accordance with claim 16 wherein said function decreases linearly with the amount of said resource used.

18. A system in accordance with claim 16 wherein the means for communicating includes a graphic display.

19. A method for administrating an awards program providing an award to a participant for increasing the level of occupancy of a rental property, comprising the steps of:

providing a mathematical function for calculating a value of the award;

determining a current level of occupancy of the rental property just prior to the time that the participant causes an increase in the level of occupancy of the rental property; and calculating the value of the award based on the current level of occupancy of the rental property, the mathematical function, therefore the value of the award, increasing as the level of occupancy of the rental property increases.

* * * * *